United States Patent
Govil et al.

(10) Patent No.: US 11,544,285 B1
(45) Date of Patent: Jan. 3, 2023

(54) AUTOMATED TRANSFORMATION OF HIERARCHICAL DATA FROM A SOURCE DATA FORMAT TO A TARGET DATA FORMAT

(71) Applicant: Accenture Global Solutions Limited, Dublin (IE)

(72) Inventors: Prashant Govil, Gurgaon (IN); Rakesh Raina, Mumbai (IN); Sourav Chatterjee, Kolkata (IN); Manasa Palleti, Bangalore (IN); Chirag Kapil, Dehradun (IN); Pallavi Shah, Mumbai (IN); Harshita Sethi, Jaipur (IN); Sabyasachi Mitra, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/408,971

(22) Filed: Aug. 23, 2021

(51) Int. Cl.
G06F 16/25 (2019.01)
G06F 16/248 (2019.01)
G06F 16/2455 (2019.01)
G06F 7/14 (2006.01)

(52) U.S. Cl.
CPC .............. *G06F 16/258* (2019.01); *G06F 7/14* (2013.01); *G06F 16/248* (2019.01); *G06F 16/2455* (2019.01)

(58) Field of Classification Search
CPC .. G06F 16/258; G06F 16/2455; G06F 16/248; G06F 7/14
USPC ........................................................ 707/756
See application file for complete search history.

(56) References Cited

U.S. PATENT DOCUMENTS

| | | | |
|---|---|---|---|
| 9,639,631 B2 | 5/2017 | Williamson | |
| 10,546,001 B1* | 1/2020 | Nguyen | G06F 40/186 |
| 10,592,525 B1* | 3/2020 | Khante | G06F 16/258 |
| 10,936,585 B1* | 3/2021 | Echeverria | G05B 13/00 |
| 11,113,294 B1* | 9/2021 | Bourbie | G06F 16/24568 |
| 11,216,511 B1* | 1/2022 | Bigdelu | G06F 16/248 |
| 11,263,268 B1* | 3/2022 | Bourbie | G06F 16/2228 |

(Continued)

FOREIGN PATENT DOCUMENTS

WO   WO-2005043413 A1 *   5/2005   ........... G06F 16/258

OTHER PUBLICATIONS

Website: "https://stackoverflow.com/questions/17277107/hierarchical-xml-to-json," Jun. 2013, 3 Pages.

(Continued)

*Primary Examiner* — Dung K Chau
(74) *Attorney, Agent, or Firm* — Harrity & Harrity, LLP

(57) ABSTRACT

A device may receive, from a source system, data in a first format, data in a second format, or a combination of data in the first format and data in the second format. The device may identify a data format type, a hierarchy depth, levels, and objects at each of the levels for the data and may generate a template based on the data format type, the hierarchy depth, the levels, and the objects at each of the levels. The device may generate a query, for the data in the first format, based on the template and may execute the query, on the data in the first format, to generate query results associated with a target system. The device may process the query results, with the template, to generate output data in a third format associated with the target system and may perform actions based on the output data.

20 Claims, 10 Drawing Sheets

(56) References Cited

U.S. PATENT DOCUMENTS

| | | | | |
|---|---|---|---|---|
| 11,269,871 B1* | 3/2022 | Bigdelu | ............. | G06F 16/2428 |
| 11,386,158 B1* | 7/2022 | Bourbie | ............ | G06F 16/90328 |
| 2014/0379615 A1* | 12/2014 | Brigham | ................ | G06N 3/126 |
| | | | | 706/11 |

OTHER PUBLICATIONS

Website: "https://docs.informatica.com/integration-cloud/cloud-data-integration/current-version/transformations/hierarchy-parser-transformation.html," Jul. 20, 2021, 2 Pages.

Bethke, "Optimisation algorithms for converting XML and JSON to a relational format," Website: https://sonra.io/xml/optimisation-algorithms-for-converting-XML-and-json-to-a-relational-format, 2021, 13 Pages.

Website: "https://stackoverflow.com/questions/4056419/how-would-i-express-xml-tag-attributes-in-json," Nov. 2010, 14 Pages.

Website: "http://badgerfish.ning.com," 2021, 4 Pages.

Website: "http://www.jsonml.org," 2021, 4 Pages.

Kay, "Transforming JSON using XSLT 3.0," 2016, pp. 167-183.

Oracle, "Oracle Digital Experience for Communications (DX4C) Executive Paper,?" 2020, 4 Pages.

Oracle Communications, "Digital Experience for Communications Digital Convergence," 2019, 3 Pages.

Oracle, "Siebel CRM on Oracle Cloud Infrastructure FAQ," 2015, 4 Pages.

Oracle, "Siebel CRM on Oracle Compute Cloud Service, Oracle Best Practices," Sep. 2016, 8 Pages.

* cited by examiner

AUTOMATED TRANSFORMATION OF HIERARCHICAL DATA FROM A SOURCE DATA FORMAT TO A TARGET DATA FORMAT

BACKGROUND

Currently, with initiatives involving assessment and relocation of a system to a cloud computing environment, data transformation plays a very important role. The process of arriving at a complex hierarchical data format (e.g., a JavaScript object notation (JSON) format) compatible in the cloud computing environment is usually very cumbersome and technically challenging, even more so as a majority of current systems support non-hierarchical data structures.

SUMMARY

Some implementations described herein relate to a method. The method may include receiving, from a source system, data in a first format, data in a second format, or a combination of data in the first format and data in the second format. The method may include identifying a data format type, a hierarchy depth, levels, and objects at each of the levels for the data, and generating a template based on the data format type, the hierarchy depth, the levels, and the objects at each of the levels for the data. The method may include generating a query, for the data in the first format, based on the template and executing the query, on the data in the first format, to generate query results associated with a target system. The method may include processing the query results, with the template, to generate output data in a third format associated with the target system and performing one or more actions based on the output data.

Some implementations described herein relate to a device. The device may include one or more memories and one or more processors coupled to the one or more memories. The one or more processors may be configured to receive, from a source system, data in a first format, data in a second format, or a combination of data in the first format and data in the second format. The one or more processors may be configured to identify a data format type, a hierarchy depth, levels, and objects at each of the levels for the data and generate a template based on the data format type, the hierarchy depth, the levels, and the objects at each of the levels for the data. The one or more processors may be configured to generate a query, for the data in the first format, based on the template and execute the query, on the data in the first format, to generate query results associated with a target system. The one or more processors may be configured to process the query results, with the template, to generate a first set of output data in a third format associated with the target system. The one or more processors may be configured to process the data in the second format, with the template, to generate a second set of output data in the third format associated with the target system. The one or more processors may be configured to combine the first set of output data and the second set of output data to generate final output data in the third format and perform one or more actions based on the final output data.

Some implementations described herein relate to a non-transitory computer-readable medium that stores a set of instructions for a device. The set of instructions, when executed by one or more processors of the device, may cause the device to receive, from a source system, data in a first format, data in a second format, or a combination of data in the first format and data in the second format. The first format may include a structured query language format and the second format may include an extensible markup language format. The set of instructions, when executed by one or more processors of the device, may cause the device to identify a data format type, a hierarchy depth, levels, and objects at each of the levels for the data and generate a template based on the data format type, the hierarchy depth, the levels, and the objects at each of the levels for the data. The set of instructions, when executed by one or more processors of the device, may cause the device to generate a query, for the data in the first format, based on the template and execute the query, on the data in the first format, to generate query results associated with a target system. The set of instructions, when executed by one or more processors of the device, may cause the device to process the query results, with the template, to generate output data in a third format associated with the target system. The third format may include a JavaScript object notation format. The set of instructions, when executed by one or more processors of the device, may cause the device to perform one or more actions based on the output data.

DETAILED DESCRIPTION

Figure 1A:
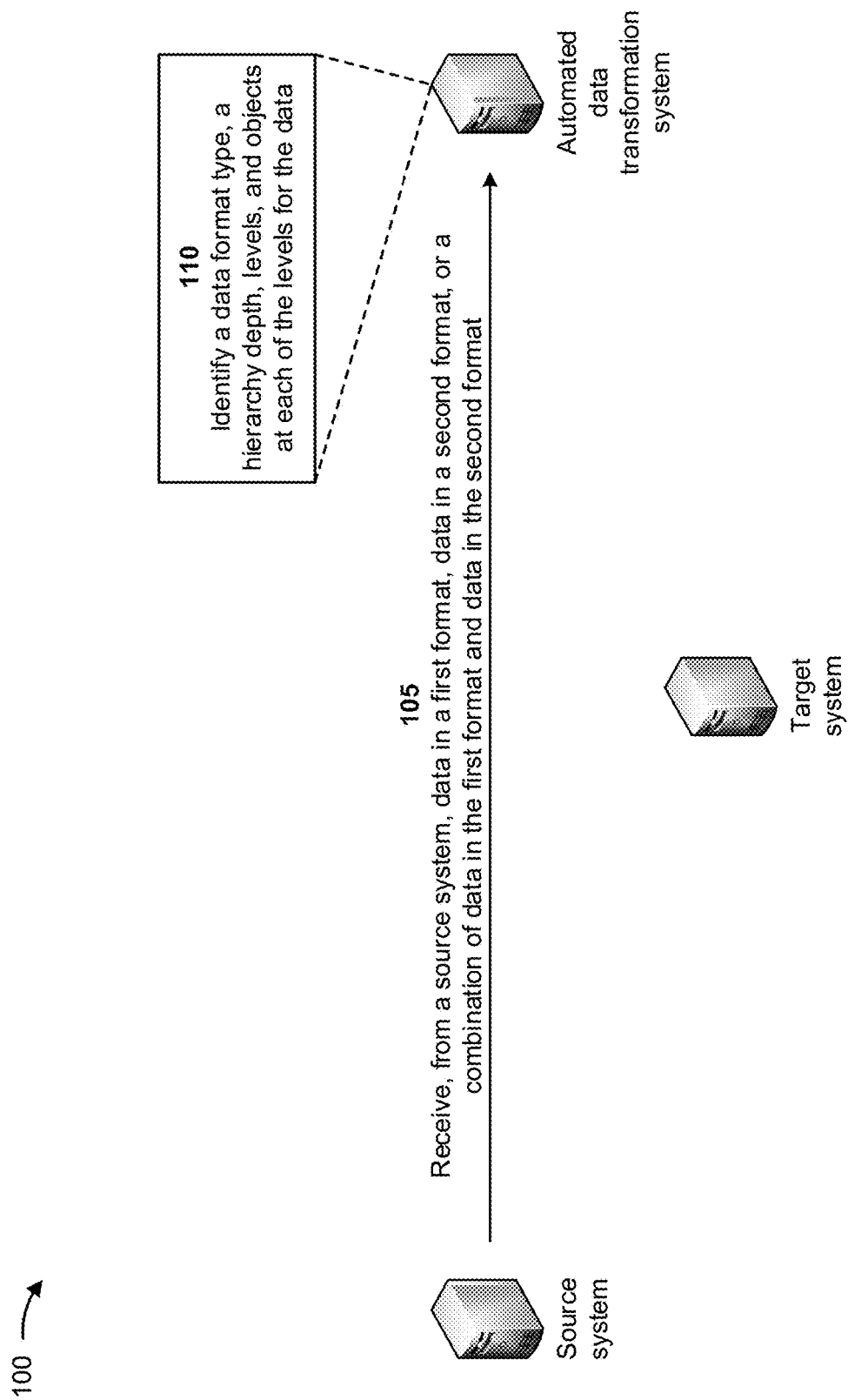
FIGS. 1A-1G are diagrams of an example implementation described herein.

The following detailed description of example implementations refers to the accompanying drawings. The same reference numbers in different drawings may identify the same or similar elements.

Current techniques for data migration from a source system to a target system utilize seeded representational state transfer (REST) application programming interfaces (APIs) to transfer and/or setup data to be migrated. However, request bodies required by the REST APIs are complex to create and manage due to a multi-level hierarchy and multiple relationship items. For example, to create a complex request to migrate data to a particular format (e.g., a hierarchical data format, such a JSON format with multiple JSON objects) requires separately writing code for each data entity. Thus, any modifications to the hierarchical data format requires a code change. Field-to-field mapping is also required while writing the codes since fields present in the source system data may not be present in the target system. Therefore, current techniques for data migration from a source system to a target system consume computing resources (e.g., processing resources, memory resources, communication resources, and/or the like), networking resources, and/or the like associated with incorrectly migrating data from the source system to the target system, implementing cumbersome migrations, modifying cumbersome migrations, reperforming the migration of the data from the source system to the target system, and/or like.

Some implementations described herein relate to an automated data transformation system that provides automated transformation of data from a source data format to a target data format. For example, the automated data transformation system may receive, from the source system, data in a first format, data in a second format, or a combination of data in the first format and data in the second format. The automated data transformation system may identify a data format type, a hierarchy depth, levels, and objects at each of the levels for the data and may generate a template based on the data format type, the hierarchy depth, the levels, and the objects at each of the levels for the data. The automated data transformation system may generate a query, for the data in the first format, based on the template and may execute the query, on the data in the first format, to generate query results associated with a target system. The automated data transformation system may process the query results, with the template, to generate a first set of output data in a third format associated with the target system. The automated data transformation system may process the data in the second format, with the template, to generate a second set of output data in the third format associated with the target system. The automated data transformation system may combine the first set of output data and the second set of output data to generate final output data in the third format and may perform one or more actions based on the final output data.

In this way, the automated data transformation system provides automated transformation of data from a source data format to a target data format. The automated data transformation system may create a template (e.g., an Excel template) that can transform data in a first format (e.g., a structured query language (SQL) format) or a second format (e.g., an extensible markup language (XML) format) to output data in a third format (e.g., a hierarchical data format). Using Excel templates, the automated data transformation system can easily configure a data structure for input extract as SQL or XML and output JSON. The automated data transformation system may provide field-to-field mapping via the template in order to produce the output data in the third format. The automated data transformation system may provide any hierarchy transformation while maintaining a relationship between the source system and the target system. The automated data transformation system may modify the template to attain any target output data, may perform validation checks of the migration, and may provide selective or complete transformation of data from the source data format to the target data format. This, in turn, conserves computing resources, networking resources, and/or the like that would otherwise have been consumed in incorrectly migrating data from the source system to the target system, implementing cumbersome migrations, modifying cumbersome migrations, reperforming the migration of the data from the source system to the target system, and/or like.

FIGS. 1A-1G are diagrams of an example 100 associated with automated transformation of data from a source data format to a target data format. As shown in FIGS. 1A-1G, example 100 includes a source system, a target system, and an automated data transformation system. Each of the source system and the target system may include a computing device, a server device, a cloud-based device, and/or the like. The automated data transformation system may include a system that provides automated transformation of data from a source data format to a target data format. Further details of the source system, the target system, and the automated data transformation system are provided elsewhere herein.

As shown in FIG. 1A, and by reference number 105, the automated data transformation system may receive, from the source system, data in a first format, data in a second format, or a combination of data in the first format and data in the second format. The data in the first format may include data provided in a domain-specific language format, such as an SQL format. Data in an SQL format may include data stored in a relational database management system (RDBMS) or data used for stream processing in a relational data stream management system (RDSMS). The data in the second format may include data provided in a markup language format, such as an XML, format. Data in an XML, format may include data stored in a format that is both human-readable and machine-readable. The data in the combination of data in the first format and data in the second format may include some data provided in the SQL format and some data provided in the XML format. In some implementations, the first format and/or the second format may include different formats than the SQL format and the XML, format, respectively. Furthermore, the data received from the source system may include three or more different formats.

As further shown in FIG. 1A, and by reference number 110, the automated data transformation system may identify a data format type, a hierarchy depth, levels, and objects at each of the levels for the data. In some implementations, the automated data transformation system may analyze the data received from the source system, and may identify the data format type, the hierarchy depth, the levels, and the objects at each of the levels for the data based on analyzing the data received from the source system. The data format type may include the first format, the second format, or the combination of data in the first and second formats. The hierarchy depth may include a quantity of the levels provided to achieve a target data hierarchy. The levels may include different nested portions or layers provided in the data received from the source system. The objects may include a quantity of "children" (e.g., schemas, journals, catalogs, tables, aliases, views, indexes, constraints, triggers, masks, permissions, sequences, stored procedures, user-defined functions, user-defined types, global variables, nodes, and/or the like) to depict the number of independent JSON objects at each level depth.

Figure 1B:
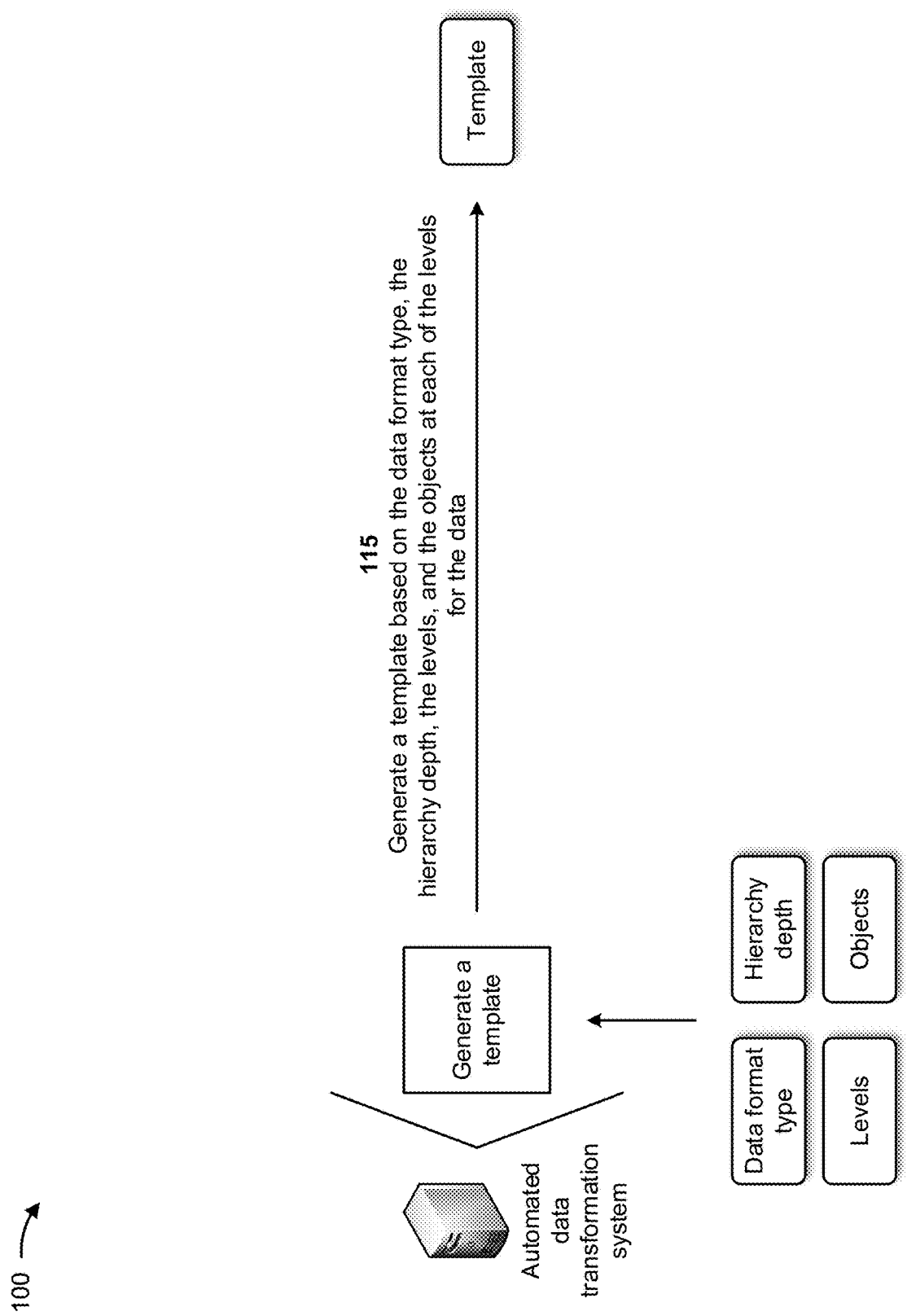

As shown in FIG. 1B, and by reference number 115, the automated data transformation system may generate a template based on the data format type, the hierarchy depth, and the objects at each of the levels for the data. In some implementations, the automated data transformation system may generate a spreadsheet template (e.g., an Excel template) based on the data format type, the hierarchy depth, and the objects at each of the levels for the data. The spreadsheet template may include multiple columns, such as a data format type column, an SQL query type column, a static SQL query column, a hierarchy level column, a quantity of children column, a rest end point column, an XML file path column, a starting path column, a key fields column, a key data type column, an alias column, an)(Path column, an XML, condition column, a LOV column (e.g., any field may include a defined static value and the LOV column is utilized to map the static value to a source and a target), a table column, a database columns column, a condition column, a primary key column, a merge column, and/or the like.

The data format type column may include one or more fields that identify a data format type associated with the data, such as a first format type (e.g., SQL) or a second format type (e.g., XML).

The SQL query type column may include one or more fields that identify how a query is formed (e.g., dynamic or static) when the data format type is the first format type or the combination of the first format type and the second format type.

The static SQL query column may include one or more fields that identify an entire query when the SQL query type is static and when the data format type is the first format type or the combination of the first format type and the second format type.

The hierarchy level column may include one or more fields that identify a level of hierarchy for output data in a third format (e.g., a JSON format). For example, the hierarchy level column may include a value of four when up to four nested JSON levels are to be created.

The quantity of children column may include one or more fields that identify a quantity of separate objects (e.g., JSON children) at each hierarchical level starting from level two. For example, the quantity of children column may include the values five, four, and two, which may indicate that there are five individual objects at the second level, four individual objects at the third level, and two individual objects at the fourth level.

The rest end point column may include one or more fields that identify a REST uniform resource locator (URL) when the output data is to be sent as a request body to the target system.

The XML file path column may include one or more fields that identify a physical file path of the XML, from which data is to be extracted when the data format type is the second format type or the combination of the first format type and the second format type.

The starting path column may include one or more fields that identify a path from a root parent of a starting tag to be considered in the data received from the source system.

The key fields column may include one or more fields that identify output keys (e.g., JSON output keys) for each hierarchy level of the output data. The output keys may be stored in other (e.g., subsequent) columns with a parent indicator (e.g., suffixing "_>" after key name) to represent a drilldown level.

The key data type column may include one or more fields that identify data types for the output keys (e.g., the JSON output keys) for each hierarchy level of the output data.

The alias column may include one or more fields that identify aliases for the output keys to depict parent and child information (e.g., level and object information). The aliases may be prefixed with L(m) (e.g., where L represents a level and m represents a current node depth) and C(n) (e.g., where C represents children and n represents a current JSON object number on a certain level).

The XPath path column may include one or more fields that identify a path (e.g., with nodes mentioned in a hierarchy from a root level separated by a slash) from a root parent when the data format type is the second format type or the combination of the first format type and the second format type.

The XML condition column may include one or more fields that identify a condition to consider a selective identifier or inputs with a same path in the data in the second format type.

The LOV column may include one or more fields that modify an input value, from the data received from the source system, to a desired output value in the output data.

The table column may include one or more fields that identify database tables from which the data received from the source system is to be extracted when the data format type is the first format type or the combination of the first format type and the second format type.

The database columns column may include one or more fields that identify database columns from the database tables, and mapped to the output keys, when the data format type is the first format type or the combination of the first format type and the second format type.

The condition column may include one or more fields that identify a clause to join multiple database tables to obtain desired output data when the data format type is the first format type or the combination of the first format type and the second format type.

The primary key column may include one or more fields that identify the output keys identified in the alias column. The identified output keys may act as a primary key for the output data.

The merge column may include one or more fields that identify the output keys into which other output keys may be merged in the output data.

Figure 1C:
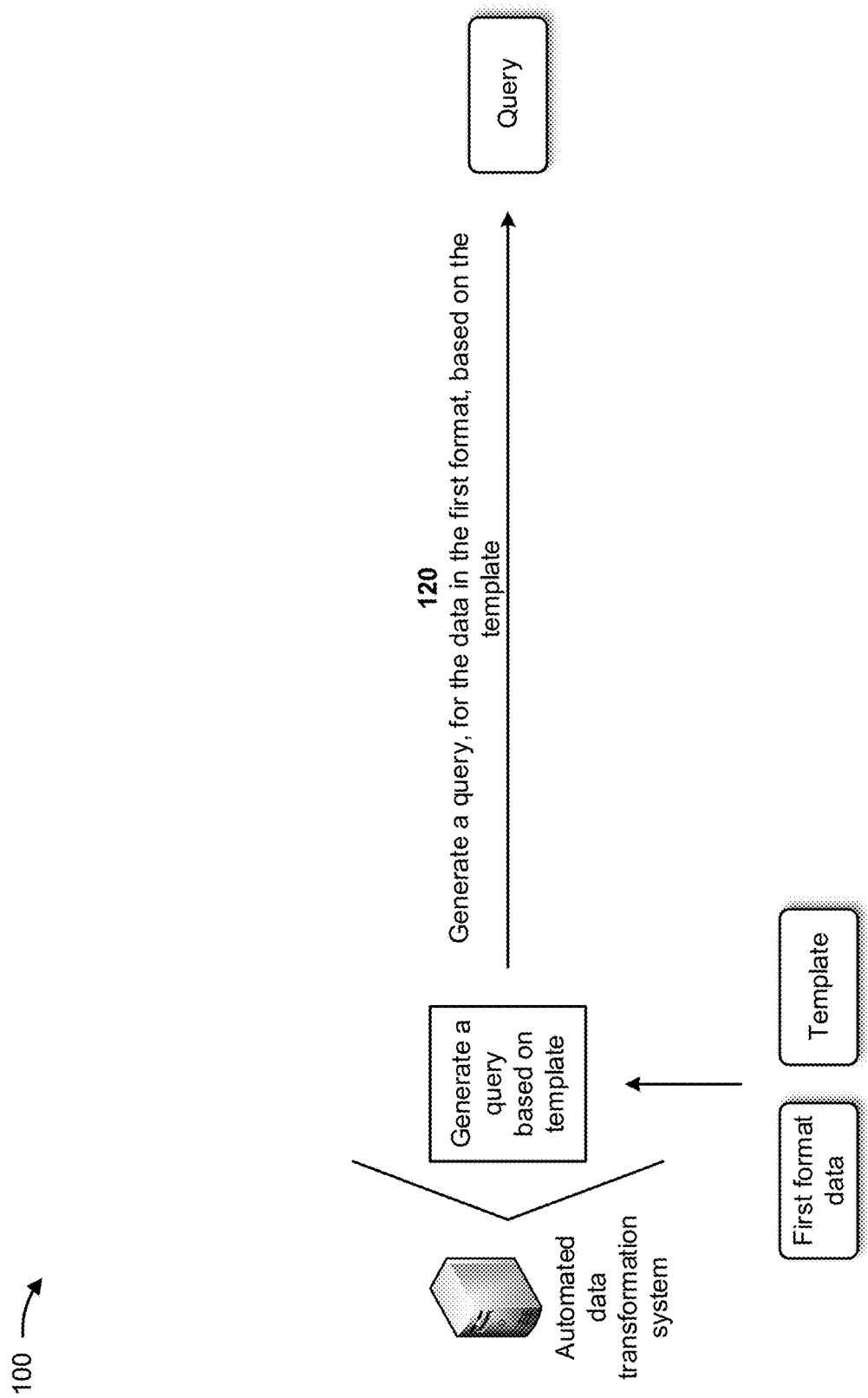

As shown in FIG. 1C, and by reference number 120, the automated data transformation system may generate a query, for the data in the first format, based on the template. For example, the automated data transformation system may generate the query, for the data in the first format, by concatenating the columns of the template. The query may include instructions to fetch data associated with data types in the first format; instructions to tag the fetched data to hierarchy levels as defined in the alias column of the template; instructions to parse the fetched data based on tagging the fetched data; instructions to map a primary identifier for each object level; instructions to merge an object up one level in a cascading manner based on the primary identifier and sequences of the levels; instructions to remove L(m)_C(n) tags from output keys; instructions to validate the output data based on the data format type specified in the template; and/or the like.

Figure 1D:
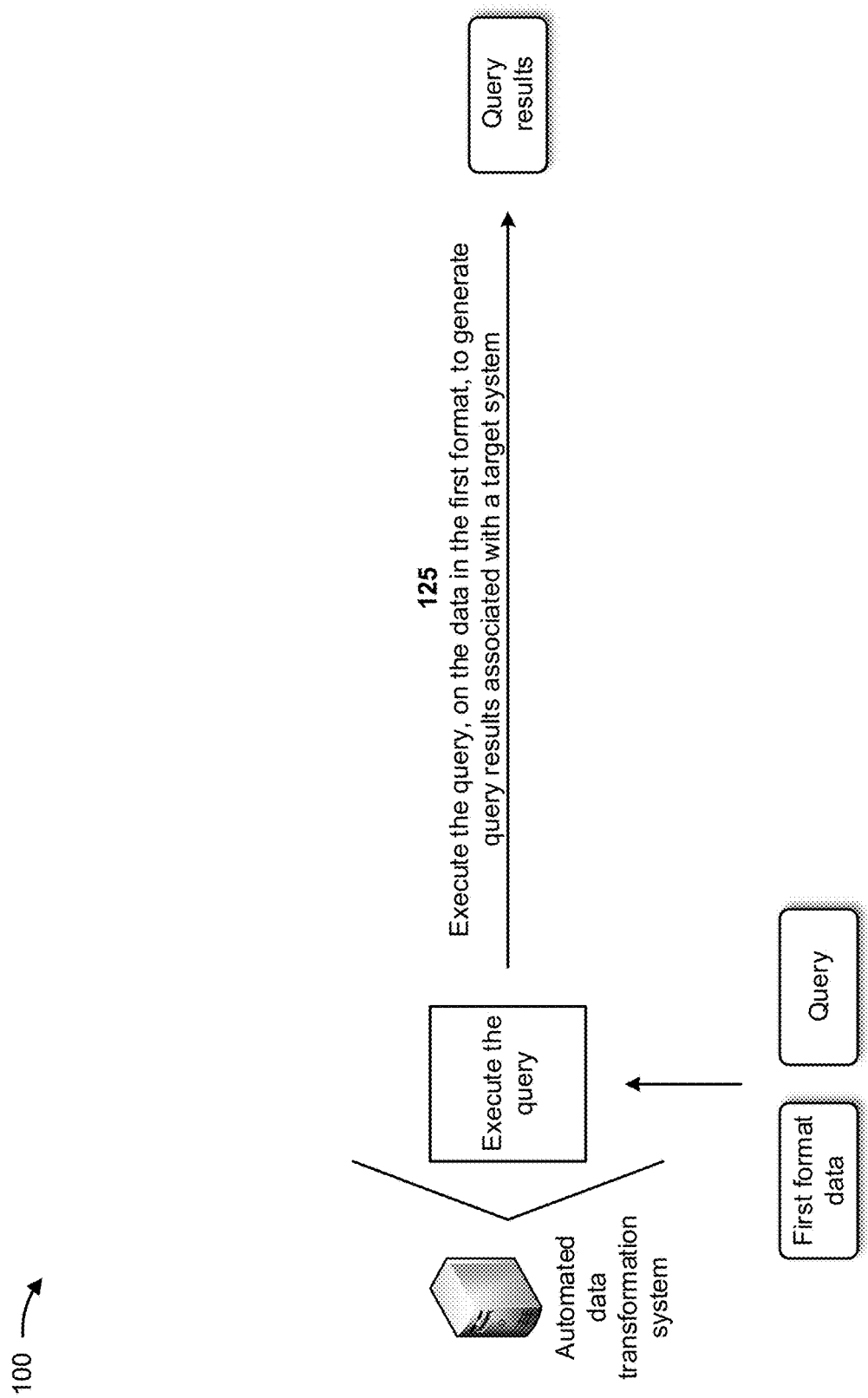

As shown in FIG. 1D, and by reference number 125, the automated data transformation system may execute the query, on the data in the first format, to generate query results associated with the target system. In some implementations, the automated data transformation system may communicate with the source system and may execute the query on the data in the first format provided in a data structure associated with the source system. Execution of the query may generate the query results associated with the target system. The query may cause the automated data transformation system to fetch data associated with data types in the first format from the source system; tag the fetched data to hierarchy levels as defined in the alias column of the template; parse the data based on tagging the fetched data; map a primary identifier for each object level; merge an object up one level in a cascading manner based on the primary identifier and sequences of the levels; remove tags from the query results; validate the query results based on the data format type specified in the template; and/or the like.

Figure 1E:
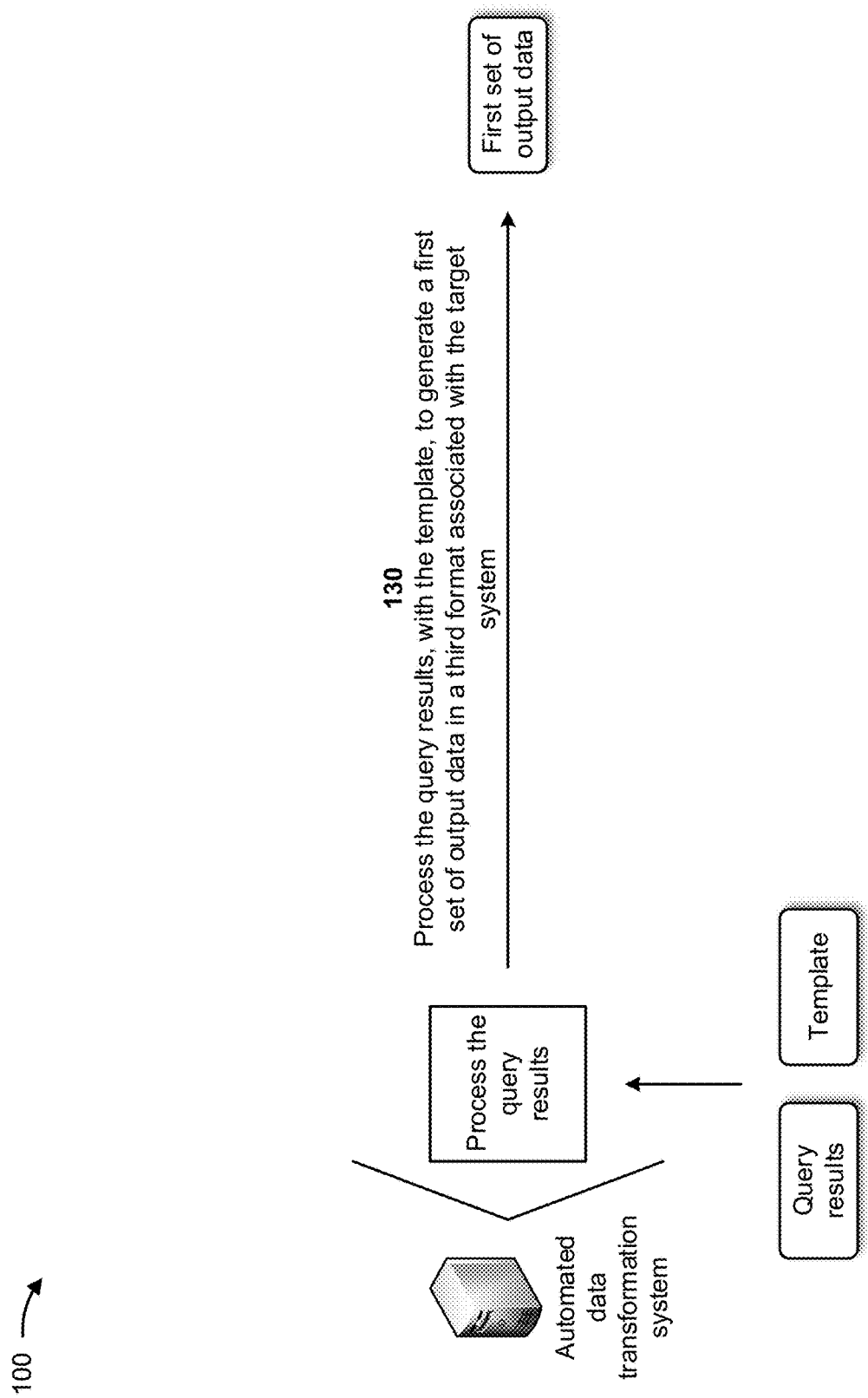

As shown in FIG. 1E, and by reference number 130, the automated data transformation system may process the query results, with the template, to generate a first set of output data in a third format associated with the target system. For example, the automated data transformation system may parse the query results by levels and by objects included in each of the levels. The automated data transformation system may utilize the template to generate a hierarchy based on the levels and to generate keys based on the objects included in each of the levels. The generated hierarchy and keys may form the first set of the output data in the third format. The third format may include a standard file format and/or a data interchange format, such as a JSON format. The JSON format is an open standard file format and data interchange format that uses human-readable text to store and transmit data objects consisting of attributes (e.g., value pairs and arrays).

Figure 1F:
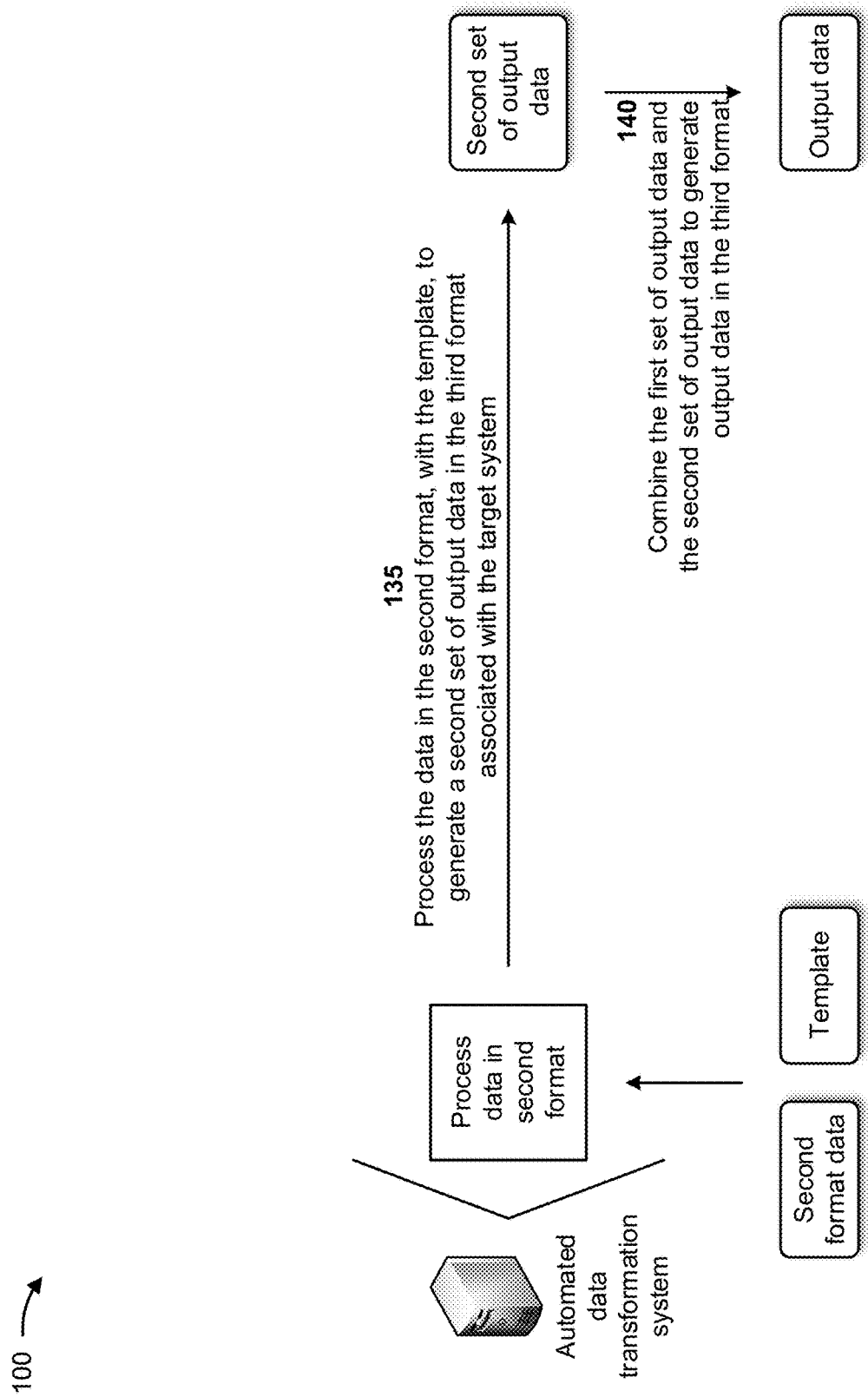

As shown in FIG. 1F, and by reference number 135, the automated data transformation system may process the data in the second format, with the template, to generate a second set of output data in the third format associated with the target system. For example, the automated data transformation system may identify a starting point for reading the data in the second format (e.g., the XML, format) based on the file path (e.g., the XML, file path) column included in the template. The automated data transformation system may identify an initial node list based on the starting point. For each element in the initial node list, the automated data transformation system may read the template to identify additional node paths or xpaths in the data in the second format. The automated data transformation system may determine values associated with the file paths and may append the values to the data in the second format in a cascading manner. This may create a level-object relationship in the data and may generate the second set of output data in the third format.

As further shown in FIG. 1F, and by reference number 140, the automated data transformation system may combine the first set of output data and the second set of output data to generate output data in the third format. For example, the automated data transformation system may combine the first set of output data and the second set of output data, to generate output data in the third format, by appending the second set of output data to the first set of output data, by appending the first set of output data to the second set of output data, by randomly or pseudo-randomly merging the first set of output data and the second set of output data, and/or the like.

Figure 1G:
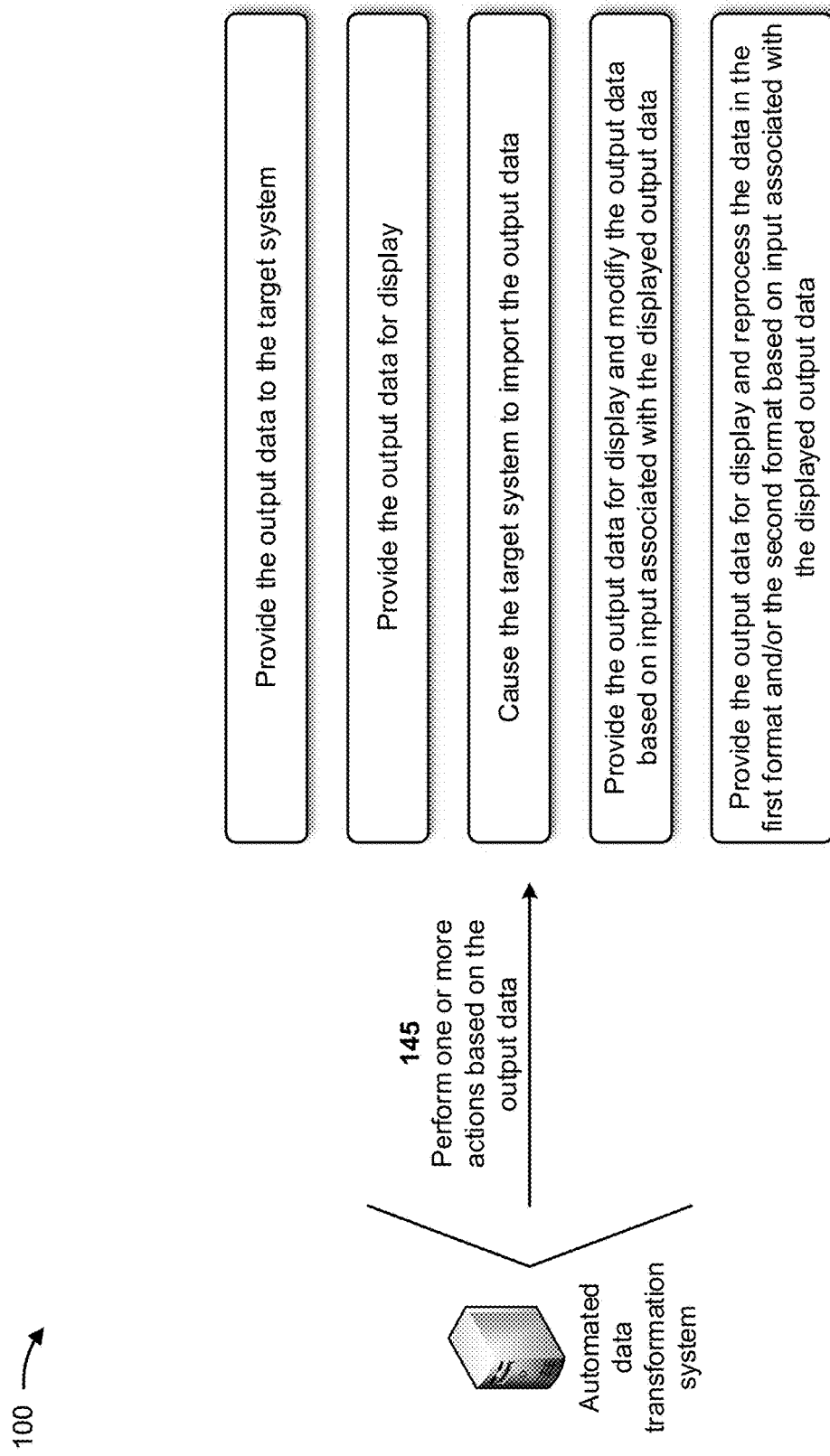

As shown in FIG. 1G, and by reference number 145, the automated data transformation system may perform one or more actions based on the output data. In some implementations, the one or more actions include the automated data transformation system providing the output data to the target system. For example, the automated data transformation system may provide output data in the third format to the target system and the target system may receive and store the output data in a data structure (e.g., a database, a table, a list, and/or the like) associated with the target system. The output data may be provided in a format (e.g., the third format) that may be processed by the target system. In this way, the automated data transformation system may conserve computing resources, networking resources, and/or the like that would otherwise have been consumed in incorrectly migrating data from the source system to the target system, implementing cumbersome migrations, modifying cumbersome migrations, reperforming the migration of the data from the source system to the target system, and/or like.

In some implementations, the one or more actions include the automated data transformation system providing the output data for display. For example, the automated data transformation system may provide the output data for display to a user of the automated data transformation system so that the user may determine whether the output data is correct. Once the user determines that the output data is correct, the automated data transformation system may provide the output data to the target system. The output data may be provided in a format (e.g., the third format) that may be processed by the target system. In this way, the automated data transformation system may conserve computing resources, networking resources, and/or the like that would otherwise have been consumed in incorrectly migrating data from the source system to the target system, implementing cumbersome migrations, modifying cumbersome migrations, reperforming the migration of the data from the source system to the target system, and/or like.

In some implementations, the one or more actions include the automated data transformation system causing the target system to import the output data. For example, the automated data transformation system may provide, to the target system, a notification indicating that the output data is available for importing. The target system may import the output data from the automated data transformation system based on the notification. The output data may be imported in a format (e.g., the third format) that may be processed by the target system. In this way, the automated data transformation system may conserve computing resources, networking resources, and/or the like that would otherwise have been consumed in incorrectly migrating data from the source system to the target system, reperforming the migration of the data from the source system to the target system, and/or like.

In some implementations, the one or more actions include the automated data transformation system providing the output data for display and modifying the output data based on input associated with the displayed output data. For example, the automated data transformation system may provide the output data for display to a user of the automated data transformation system, and may receive, from the user, an input (e.g., a correction to the output data) based on the output data being displayed. The automated data transformation system may modify the output data based on the input received from the user. In this way, the automated data transformation system may conserve computing resources, networking resources, and/or the like that would otherwise have been consumed in incorrectly migrating data from the source system to the target system, reperforming the migration of the data from the source system to the target system, and/or like.

In some implementations, the one or more actions include the automated data transformation system provide the output data for display and reprocess the data in the first format and/or the second format based on input associated with the displayed output data. For example, the automated data transformation system may provide the output data for display to a user of the automated data transformation system and may receive, from the user, an input (e.g., indicating to reprocess the data in the first format and/or the second format) based on the output data being displayed. The automated data transformation system may reprocess the data in the first format and/or the second format based on the input. In this way, the automated data transformation system may conserve computing resources, networking resources, and/or the like that would otherwise have been consumed in incorrectly migrating data from the source system to the target system, and/or like.

In this way, the automated data transformation system provides automated transformation of data from a source data format to a target data format. The automated data transformation system may create a template (e.g., a Java-based library) that can transform data in a first format (e.g., a SQL format) or a second format (e.g., an XML, format) to output data in a third format (e.g., a JSON format). Using Excel templates, the automated data transformation system can easily configure a data structure for input extract or XML and output JSON. The automated data transformation system may provide field-to-field mapping via the template in order to produce the output data in the third format. The automated data transformation system may provide any hierarchy transformation while maintaining a relationship between the source system and the target system. The automated data transformation system may modify the template to attain any target output data, may perform validation checks of the migration, and may provide selective or complete transformation from the source data format to the target data format. This, in turn, conserves computing resources, networking resources, and/or the like that would otherwise have been consumed in incorrectly migrating data from the source system to the target system, implementing cumbersome migrations, modifying cumbersome migrations, reperforming the migration of the data from the source system to the target system, and/or like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
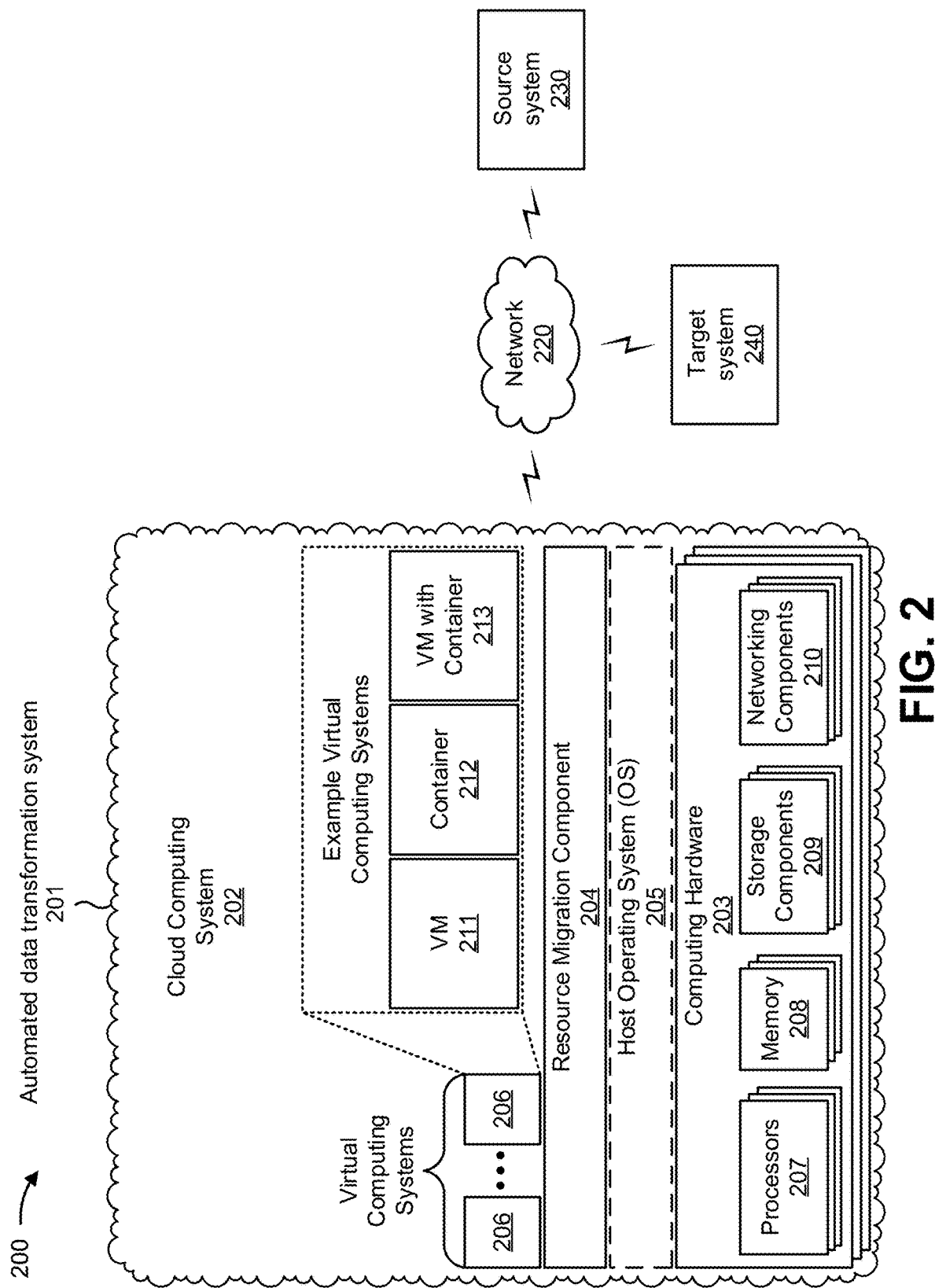
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an automated data transformation system 201, which may include one or more elements of and/or may execute within a cloud computing system 202. The cloud computing system 202 may include one or more elements 203-213, as described in more detail below. As further shown in FIG. 2, environment 200 may include a network 220, a source system 230, and/or a target system 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

The virtual computing system 206 includes a virtual environment that enables cloud-based execution of operations and/or processes described herein using the computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the automated data transformation system 201 may include one or more elements 203-213 of the cloud computing system 202, may execute within the cloud computing system 202, and/or may be hosted within the cloud computing system 202, in some implementations, the automated data transformation system 201 may not be cloud-based (e.g., may be implemented outside of a cloud computing system) or may be partially cloud-based. For example, the automated data transformation system 201 may include one or more devices that are not part of the cloud computing system 202, such as device 300 of FIG. 3, which may include a standalone server or another type of computing device. The automated data transformation system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The source system 230 includes one or more devices capable of receiving, generating, storing, processing, providing, and/or routing information, as described elsewhere herein. The source system 230 may include a communication device and/or a computing device. For example, the source system 230 may include a server, such as an application server, a client server, a web server, a database server, a host server, a proxy server, a virtual server (e.g., executing on computing hardware), or a server in a cloud computing system. In some implementations, the source system 230 includes computing hardware used in a cloud computing environment. The source system 230 may communicate with one or more other devices of the environment 200, as described elsewhere herein.

The target system 240 includes one or more devices capable of receiving, generating, storing, processing, providing, and/or routing information, as described elsewhere herein. The target system 240 may include a communication device and/or a computing device. For example, the target system 240 may include a server, such as an application server, a client server, a web server, a database server, a host server, a proxy server, a virtual server (e.g., executing on computing hardware), or a server in a cloud computing system. In some implementations, the target system 240 includes computing hardware used in a cloud computing environment. The target system 240 may communicate with one or more other devices of the environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
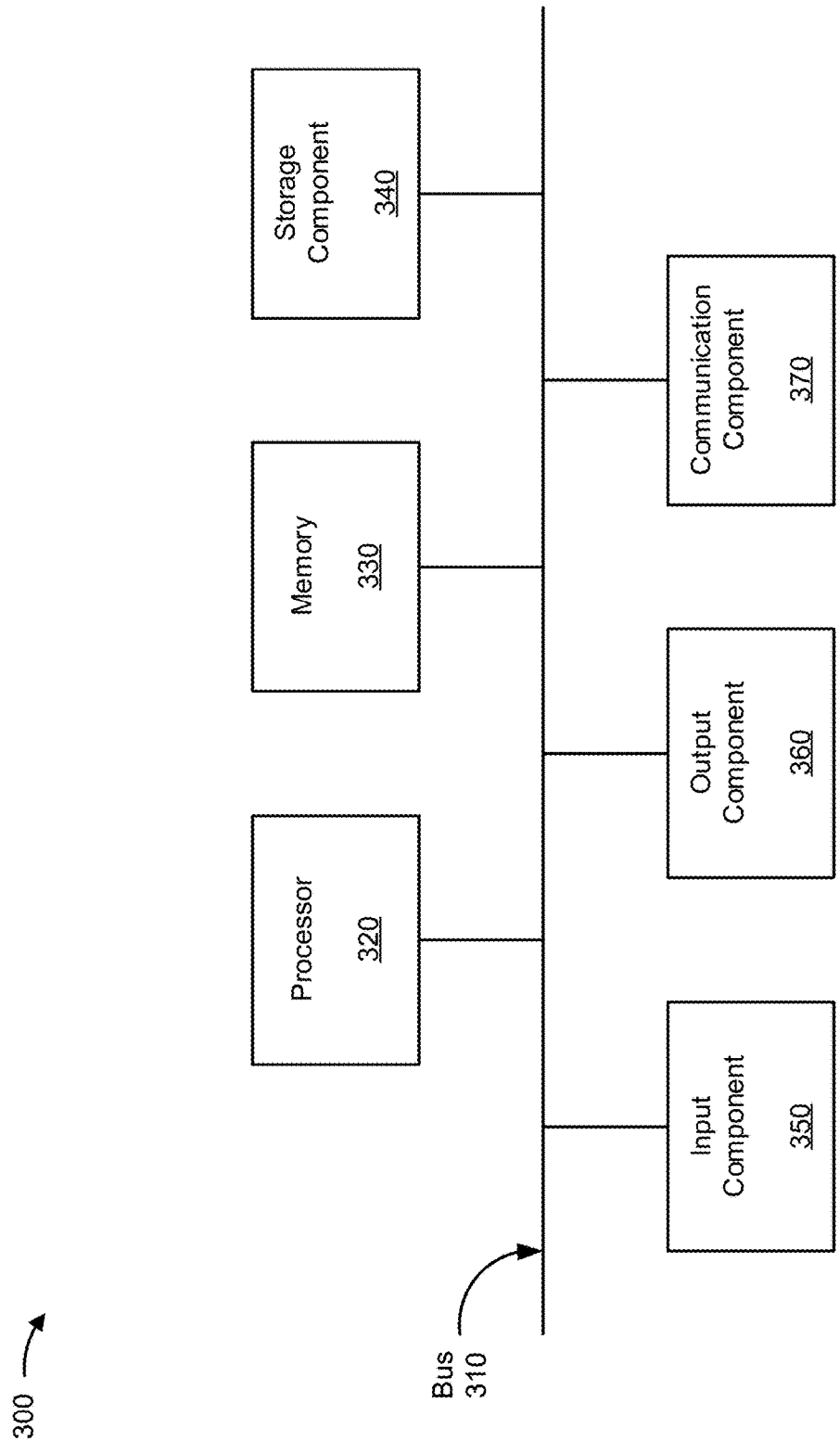
FIG. 3 is a diagram of example components of one or more devices of FIG. 2.

FIG. 3 is a diagram of example components of a device 300, which may correspond to the automated data transformation system 201, the source system 230, and/or the target system 240. In some implementations, the automated data transformation system 201, the source system 230, and/or the target system 240 may include one or more devices 300 and/or one or more components of the device 300. As shown in FIG. 3, device 300 may include a bus 310, a processor 320, a memory 330, a storage component 340, an input component 350, an output component 360, and a communication component 370.

The bus 310 includes a component that enables wired and/or wireless communication among the components of the device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The storage component 340 stores information and/or software related to the operation of the device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables the device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables the device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
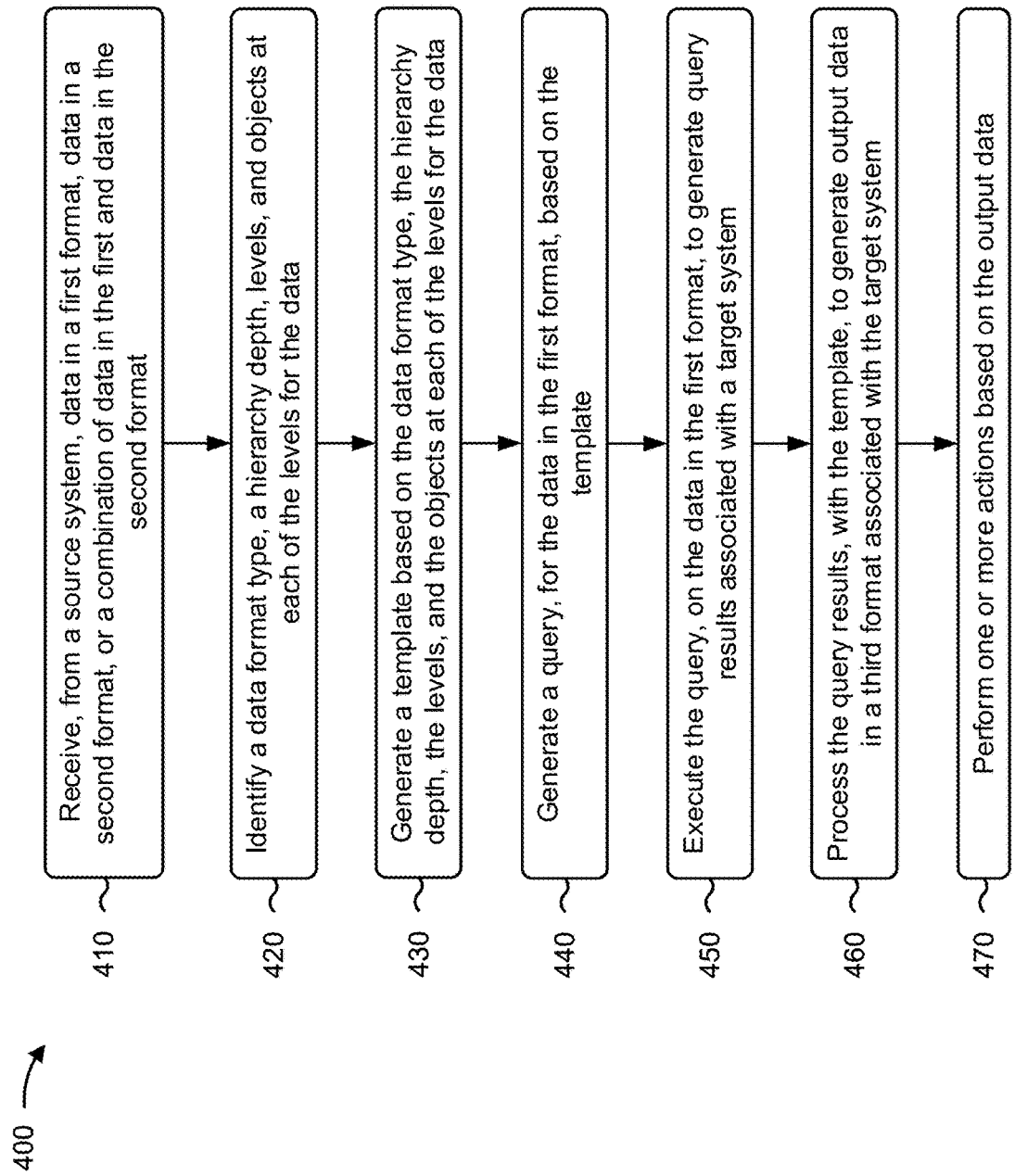
FIG. 4 is a flowchart of an example process for automated transformation of data from a source data format to a target data format.

FIG. 4 is a flowchart of an example process 400 for automated transformation of data from a source data format to a target data format. In some implementations, one or more process blocks of FIG. 4 may be performed by a device (e.g., the automated data transformation system 201). In some implementations, one or more process blocks of FIG. 4 may be performed by another device or a group of devices separate from or including the device, such as a source system (e.g., the source system 230) and/or a target system (e.g., the target system 240). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include receiving, from a source system, data in a first format, data in a second format, or a combination of data in the first format and data in the second format (block 410). For example, the device may receive, from a source system, data in a first format, data in a second format, or a combination of data in the first format and data in the second format, as described above.

As further shown in FIG. 4, process 400 may include identifying a data format type, a hierarchy depth, levels, and objects at each of the levels for the data (block 420). For example, the device may identify a data format type, a hierarchy depth, levels, and objects at each of the levels for the data, as described above.

As further shown in FIG. 4, process 400 may include generating a template based on the data format type, the hierarchy depth, the levels, and the objects at each of the levels for the data (block 430). For example, the device may generate a template based on the data format type, the hierarchy depth, the levels, and the objects at each of the levels for the data, as described above. In some implementations, generating the template based on the data format type, the hierarchy depth, the levels, and the objects at each of the levels for the data includes tagging the data format type to the hierarchy depth, parsing the data based on the levels and the objects at each of the levels to generate parsed data, merging the parsed data one level up in a cascading manner to generate merged data, and generating the template based on the merged data.

In some implementations, generating the template based on the data format type, the hierarchy depth, the levels, and the objects at each of the levels for the data includes identifying a starting point for reading the data in the second format, identifying an initial node list for the data in the second format based on the starting point, determining paths for each element in the initial node list, combing values of the paths in a cascading manner to generate combined data, and generating the template based on the combined data.

As further shown in FIG. 4, process 400 may include generating a query, for the data in the first format, based on the template (block 440). For example, the device may generate a query, for the data in the first format, based on the template, as described above.

As further shown in FIG. 4, process 400 may include executing the query, on the data in the first format, to generate query results associated with a target system (block 450). For example, the device may execute the query, on the data in the first format, to generate query results associated with a target system, as described above.

As further shown in FIG. 4, process 400 may include processing the query results, with the template, to generate output data in a third format associated with the target system (block 460). For example, the device may process the query results, with the template, to generate output data in a third format associated with the target system, as described above. In some implementations, processing the query results, with the template, to generate the output data in the third format associated with the target system includes parsing the query results based on the levels and the objects at each of the levels to generate parsed query results, generating a hierarchy based on the parsed query results, and generating the output data in the third format based on the parsed query results and the hierarchy. In some implementations, the first format is a structured query language format, the second format is an extensible markup language format, and the third format is a JavaScript object notation format.

As further shown in FIG. 4, process 400 may include performing one or more actions based on the output data (block 470). For example, the device may perform one or more actions based on the output data, as described above. In some implementations, performing the one or more actions includes one or more of providing the output data to the target system, providing the output data for display, or causing the target system to import the output data. In some implementations, performing the one or more actions includes providing the output data for display, receiving an input based on the output data being displayed, and modifying the output data based on the input. In some implementations, performing the one or more actions includes providing the output data for display, receiving an input based on the output data being displayed, and reprocessing the data in the first format based on the input.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device and from a source system, data in a first format, data in a second format, or a combination of data in the first format and data in the second format;
identifying, by the device, a data format type, a hierarchy depth, levels, and objects at each of the levels for the data;
generating, by the device, a template based on the data format type, the hierarchy depth, the levels, and the objects at each of the levels for the data;
generating, by the device, a query, for the data in the first format, based on the template;
executing, by the device, the query, on the data in the first format, to generate query results associated with a target system;
processing, by the device, the query results, with the template, to generate output data in a third format associated with the target system; and
performing, by the device, one or more actions based on the output data.

2. The method of claim 1, wherein generating the template based on the data format type, the hierarchy depth, the levels, and the objects at each of the levels for the data comprises:
tagging the data format type to the hierarchy depth;
parsing the data based on the levels and the objects at each of the levels to generate parsed data;
merging the parsed data one level up in a cascading manner to generate merged data; and
generating the template based on the merged data.

3. The method of claim 1, wherein processing the query results, with the template, to generate the output data in the third format associated with the target system comprises:
parsing the query results based on the levels and the objects at each of the levels to generate parsed query results;
generating a hierarchy based on the parsed query results; and
generating the output data in the third format based on the parsed query results and the hierarchy.

4. The method of claim 1, wherein performing the one or more actions comprises one or more of:
providing the output data to the target system;
providing the output data for display; or
causing the target system to import the output data.

5. The method of claim 1, wherein performing the one or more actions comprises:
providing the output data for display;
receiving an input based on the output data being displayed; and
modifying the output data based on the input.

6. The method of claim 1, wherein performing the one or more actions comprises:
providing the output data for display;
receiving an input based on the output data being displayed; and
reprocessing the data in the first format based on the input.

7. The method of claim 1, wherein the first format is a structured query language format, the second format is an extensible markup language format, and the third format is a JavaScript object notation format.

8. A device, comprising:
one or more memories; and
one or more processors, coupled to the one or more memories, configured to:
receive, from a source system, data in a first format, data in a second format, or a combination of data in the first format and data in the second format;
identify a data format type, a hierarchy depth, levels, and objects at each of the levels for the data;
generate a template based on the data format type, the hierarchy depth, the levels, and the objects at each of the levels for the data;
generate a query, for the data in the first format, based on the template;
execute the query, on the data in the first format, to generate query results associated with a target system;
process the query results, with the template, to generate a first set of output data in a third format associated with the target system;
process the data in the second format, with the template, to generate a second set of output data in the third format associated with the target system;
combine the first set of output data and the second set of output data to generate final output data in the third format; and
perform one or more actions based on the final output data.

9. The device of claim 8, wherein the one or more processors, to generate the template based on the data format type, the hierarchy depth, the levels, and the objects at each of the levels for the data, are configured to:
identify a starting point for reading the data in the second format;
identify an initial node list for the data in the second format based on the starting point;
determine paths for each element in the initial node list;
combine values of the paths in a cascading manner to generate combined data; and
generate the template based on the combined data.

10. The device of claim 8, wherein the one or more processors, to perform the one or more actions, are configured to one or more of:
provide the final output data to the target system;
provide the final output data for display; or
cause the target system to import the final output data.

11. The device of claim 8, wherein the one or more processors, to perform the one or more actions, are configured to:
provide the final output data for display;
receive an input based on the final output data being displayed; and
modify the final output data based on the input.

12. The device of claim 8, wherein the one or more processors, to perform the one or more actions, are configured to:
provide the final output data for display;
receive an input based on the final output data being displayed; and
reprocess the data in the first format or the data in the second format based on the input.

13. The device of claim 8, wherein the first format is a structured query language format, the second format is an extensible markup language format, and the third format is a JavaScript object notation format.

14. The device of claim 8, wherein the one or more processors, to generate the template based on the data format type, the hierarchy depth, the levels, and the objects at each of the levels for the data, are configured to:
tag the data format type to the hierarchy depth;

parse the data based on the levels and the objects at each of the levels to generate parsed data;

merge the parsed data one level up in a cascading manner to generate merged data; and generate the template based on the merged data.

15. A non-transitory computer-readable medium storing a set of instructions, the set of instructions comprising:

one or more instructions that, when executed by one or more processors of a device, cause the device to:

receive, from a source system, data in a first format, data in a second format, or a combination of data in the first format and data in the second format, wherein the first format is a structured query language format, and the second format is an extensible markup language format;

identify a data format type, a hierarchy depth, levels, and objects at each of the levels for the data;

generate a template based on the data format type, the hierarchy depth, the levels, and the objects at each of the levels for the data;

generate a query, for the data in the first format, based on the template;

execute the query, on the data in the first format, to generate query results associated with a target system; and process the query results, with the template, to generate output data in a third format associated with the target system, wherein the third format is a JavaScript object notation format; and perform one or more actions based on the output data.

16. The non-transitory computer-readable medium of claim 15, wherein the one or more instructions, that cause the device to generate the template based on the data format type, the hierarchy depth, the levels, and the objects at each of the levels for the data, cause the device to:

tag the data format type to the hierarchy depth;

parse the data based on the levels and the objects at each of the levels to generate parsed data;

merge the parsed data one level up in a cascading manner to generate merged data; and generate the template based on the merged data.

17. The non-transitory computer-readable medium of claim 15, wherein the one or more instructions, that cause the device to process the query results, with the template, to generate the output data in the third format associated with the target system, cause the device to:

parse the query results based on the levels and the objects at each of the levels to generate parsed query results;

generate a hierarchy based on the parsed query results; and generate the output data in the third format based on the parsed query results and the hierarchy.

18. The non-transitory computer-readable medium of claim 15, wherein the one or more instructions, that cause the device to perform the one or more actions, cause the device to one or more of:

provide the output data to the target system;

provide the output data for display; or cause the target system to import the output data.

19. The non-transitory computer-readable medium of claim 15, wherein the one or more instructions, that cause the device to perform the one or more actions, cause the device to:

provide the output data for display;

receive an input based on the output data being displayed; and modify the output data based on the input.

20. The non-transitory computer-readable medium of claim 15, wherein the one or more instructions, that cause the device to perform the one or more actions, cause the device to:

provide the output data for display;

receive an input based on the output data being displayed; and reprocess the data in the first format based on the input.

* * * * *